United States Patent
Wagatha et al.

(10) Patent No.: US 10,703,334 B2
(45) Date of Patent: Jul. 7, 2020

(54) AUTHORIZING THE USE OF A MOTOR VEHICLE

(71) Applicant: Bayerische Motoren Werke Aktiengesellschaft, Munich (DE)

(72) Inventors: Helmut Wagatha, Oberschleissheim (DE); Stefan Heinbockel, Munich (DE); Ralf Wistorf, Munich (DE); Fredrik Hocke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/009,705

(22) Filed: Jun. 15, 2018

(65) Prior Publication Data

US 2018/0290625 A1    Oct. 11, 2018

Related U.S. Application Data

(63) Continuation of application No. PCT/EP2016/068886, filed on Aug. 8, 2016.

(30) Foreign Application Priority Data

Dec. 18, 2015    (DE) .................. 10 2015 016 557

(51) Int. Cl.
*B60R 25/24* (2013.01)
*G07C 9/00* (2020.01)
*B60R 25/04* (2013.01)

(52) U.S. Cl.
CPC ............ *B60R 25/241* (2013.01); *B60R 25/04* (2013.01); *B60R 25/24* (2013.01); *B60R 25/245* (2013.01); *G07C 9/00309* (2013.01); *B60R 2025/0415* (2013.01); *G07C 2009/00555* (2013.01); *G07C 2209/63* (2013.01)

(58) Field of Classification Search
CPC . H04B 5/00; G07C 9/00; G08C 19/00; G05B 5/19; B60R 25/00; B60R 25/24; B60R 25/40
USPC ... 340/5.61, 6.62, 5.7, 5.72, 539.13, 426.36; 455/41.1, 11.1
See application file for complete search history.

(56) References Cited

U.S. PATENT DOCUMENTS

| | | | | |
|---|---|---|---|---|
| 6,218,932 B1* | 4/2001 | Stippler | .................. | B60R 25/04 307/10.2 |
| 6,906,612 B2* | 6/2005 | Ghabra | .................. | B60R 25/24 340/5.61 |
| 6,937,136 B2 | 8/2005 | Greenwood et al. | | |
| 6,965,296 B2* | 11/2005 | Kamlah | .................. | B60R 25/00 340/10.41 |
| 6,970,679 B2* | 11/2005 | Blatz | .................. | G06K 19/0723 333/1.1 |
| 7,705,710 B2* | 4/2010 | Hermann | ................ | B60R 25/24 340/426.11 |
| 7,915,998 B2* | 3/2011 | Matsubara | ......... | G07C 9/00309 340/5.1 |
| 8,284,020 B2* | 10/2012 | Ghabra | ................. | B60R 25/245 340/5.61 |
| 8,442,719 B1* | 5/2013 | Nowottnick | ....... | G07C 9/00309 701/36 |
| 8,630,748 B2* | 1/2014 | Hermann | ................ | B60R 25/24 342/174 |
| 9,963,109 B2* | 5/2018 | Luo | ...................... | B60R 25/245 |
| 2007/0162191 A1* | 7/2007 | Matsubara | ......... | G07C 9/00309 701/1 |
| 2013/0063247 A1 | 3/2013 | Blatz | | |

FOREIGN PATENT DOCUMENTS

| | | |
|---|---|---|
| CN | 102017296 A | 4/2011 |
| CN | 104520153 A | 4/2015 |
| DE | 10 2005 013 910 B3 | 9/2006 |
| DE | 10 2010 010 057 A1 | 9/2011 |
| DE | 10 2011 079 421 A1 | 1/2013 |
| EP | 0 867 971 A2 | 9/1998 |
| EP | 1 184 236 A2 | 3/2002 |
| EP | 1 403 653 A1 | 3/2004 |
| EP | 2 498 226 A2 | 9/2012 |
| WO | WO 2015/084852 A1 | 6/2015 |

OTHER PUBLICATIONS

PCT/EP2016/068886, International Search Report dated Oct. 27, 2016 (Three (3) pages).
German Search Report issued in German counterpart application No. 10 2015 016 557.7 dated Jul. 6, 2016, with Statement of Relevancy (Twelve (12) pages).
Chinese Office Action issued in Chinese counterpart application No. 201680056773.9 dated Oct. 28, 2019, with English translation (Seventeen (17) pages).

\* cited by examiner

*Primary Examiner* — Nam V Nguyen
(74) *Attorney, Agent, or Firm* — Crowell & Moring LLP

(57) ABSTRACT

A method for authorizing the use of a motor vehicle, in particular a two-wheeled or four-wheeled motor vehicle, which has a first and a second antenna where the first antenna and the second antenna are spaced apart from each other, by a portable identification device which has an identification transmitter antenna. In order to increase the manipulation security of a known method, it is determined whether the identification device is moving toward the motor vehicle. This can on the one hand be determined in that the identification device repeatedly identifies the field strength of the signals emitted by the motor vehicle and identifies whether the field strength or field strengths is or are increasing. This can on the other hand be determined in that the identification device repeatedly determines the angle between the signals emitted by the motor vehicle and examines whether the repeatedly determined angles are increasing.

20 Claims, No Drawings

AUTHORIZING THE USE OF A MOTOR VEHICLE

CROSS REFERENCE TO RELATED APPLICATIONS

This application is a continuation of PCT international Application No. PCT/EP2016/068886, filed Aug. 8, 2016, which claims priority under 35 U.S.C. § 119 from German Patent Application No. 10 2015 016 557.7, filed Dec. 18, 2015, the entire disclosures of which are herein expressly incorporated by reference.

BACKGROUND AND SUMMARY OF THE INVENTION

The invention relates in particular to a method for authorizing the use of a motor vehicle that has at least one first and a second antenna, wherein the first antenna and the second antenna are at a physical distance from one another, by means of a portable identification transmitter that has an identification transmitter antenna. The motor vehicle is preferably a two- or four-wheeled motor vehicle.

In a known method of this kind, it is desirable to improve it further against manipulations.

The object of the invention is in particular the provision of a method for authorizing the use of a motor vehicle having improved protection against manipulations.

The method according to the invention proceeds from a method for authorizing the use of a motor vehicle, in particular a two- or four-wheeled motor vehicle, that has at least one first and a second antenna, wherein the first antenna and the second antenna are at a physical distance from one another, by means of a portable identification transmitter that has an identification transmitter antenna.

This known method is developed according to the invention by the following steps.

In a first step, the first vehicle antenna emits a first signal that is received by the identification transmitter antenna.

In a second step, the identification transmitter ascertains at least one of the spatial components of the first electromagnetic field of the received first signal, preferably using an angle-resolving magnetic field sensor.

In a third step, the second vehicle antenna emits a second signal that is received by the identification transmitter antenna.

In a fourth step, the identification transmitter ascertains at least one of the spatial components of the second electromagnetic field of the received second signal, preferably using an angle-resolving magnetic field sensor.

In a fifth step, a first computer, preferably a computer in the identification transmitter, repeatedly ascertains, after a predetermined first time interval has elapsed, the angle at least between the ascertained spatial component of the first electromagnetic field of the received first signal and the ascertained spatial component of the second electromagnetic field of the received second signal.

In a sixth step, the identification transmitter repeatedly ascertains, after a predetermined time interval, preferably the predetermined first time interval, has elapsed, the field strength of at least the first electromagnetic field of the received first signal and, preferably repeatedly, also the field strength of the second electromagnetic field of the received second signal, wherein the ascertainment of the field strengths is preferably performed using the first computer.

In a seventh step, the identification transmitter sends an authorization signal to authorize the use of the motor vehicle to the motor vehicle only if the following prerequisites are cumulatively met:

the angle repeatedly ascertained each time after the predetermined first time interval has elapsed exceeds a predetermined threshold value, the repeatedly ascertained angle increases or becomes greater, and/or the repeatedly measured field strength of the first and/or second electromagnetic field likewise increases or becomes greater.

In summary, one aspect of the method according to the invention consists in ascertaining whether the identification transmitter moves toward the motor vehicle. This can firstly be established, according to the invention, by virtue of the identification transmitter repeatedly ascertaining the field strength of the signals that are emitted by the motor vehicle and checking whether the field strength or the field strengths increases or increase. This can secondly be established, according to the invention, by virtue of the identification transmitter repeatedly determining the angle between the signals emitted by the motor vehicle and checking whether the repeatedly determined angles increase.

DESCRIPTION OF EMBODIMENTS OF THE INVENTION

In one preferred embodiment of the method according to the invention, in the motor vehicle, the ascertained angle transmitted to the motor vehicle is repeatedly provided with an applicable timestamp each time and stored in order to form a reference angle pattern for comparison with angle patterns ascertained later and to provide an authorization signal to authorize the use of the motor vehicle only in the event of a positive pattern comparison.

This measure can increase the protection from manipulations further.

In a further preferred embodiment of the method according to the invention, in the motor vehicle, the measured or ascertained field strength transmitted to the motor vehicle is repeatedly provided with an applicable timestamp each time and stored in order to form a reference field strength pattern for comparison with field strength patterns ascertained later and to provide an authorization signal to authorize the use of the motor vehicle only in the event of a positive pattern comparison.

The above optional measures can advantageously be used alternatively or in combination to increase the protection of the method according to the invention from manipulations.

In accordance with one advantageous configuration of the method according to the invention, the distance in time between the emission of the first signal by the first motor vehicle antenna and the emission of the second signal by the second motor vehicle antenna is chosen to be so short—but different than zero—over time that the identification transmitter carried by the driver is largely not moved when the driver approaches the motor vehicle. Therefore, the ascertainment of the angle at least between the ascertained spatial component of the first electromagnetic field of the received first signal and the ascertained spatial component of the second electromagnetic field of the received second signal is largely not corrupted, or does not become unusable, as a result of the movement of the driver, or as a result of the associated movement of the identification transmitter.

In one embodiment of the method according to the invention, the motor vehicle has a further, third antenna that is at a physical distance from each of the first and the second antenna. The angle at least between the ascertained spatial component of the first electromagnetic field of the received first signal and the ascertained spatial component of the third electromagnetic field of a third signal emitted by the third antenna and received by the identification transmitter is determined in analogous or identical fashion.

The above measures allow further improvement in the security of the method according to the invention against manipulations.

In one development of the method according to the invention, the spatial components of the first electromagnetic field of the received first signal that are ascertained by the identification transmitter are the x, y and z components of the electromagnetic field of a first Cartesian coordinate system.

In one embodiment of the method according to the invention, the spatial components of the second electromagnetic field of the received second signal that are ascertained by the identification transmitter are the x, y and z components of the electromagnetic field, largely the components with reference to the first Cartesian coordinate system, Largely because the Cartesian coordinate system or reference system on which the ascertainment of the components is based changes only slightly in spatial terms in the event of slight movements of the identification transmitter in very short spaces of time between the repeated ascertainment of the angles.

In accordance with one development of the method according to the invention, the spatial components of the third electromagnetic field of the received third signal that are ascertained by the identification transmitter are the x, y and z components of the electromagnetic field, largely those of the first Cartesian coordinate system.

In one embodiment of the method according to the invention, at least one first vector from the x, y and z components of the first electromagnetic field of the received first signal that are ascertained by the identification transmitter and a second vector from the x, y and z components of the second electromagnetic field of the received second signal that are ascertained by the identification transmitter are formed computationally and, from these two vectors, the scalar product thereof is formed computationally.

In a preferred configuration of the method according to the invention, the scalar product is used to determine the angle between the two vectors computationally.

The effect achieved by the above measures is that only a small processor power is required for computing the angles.

In accordance with a preferred development of the method according to the invention, the ascertained angle exceeds a predetermined threshold value of largely zero degrees. In particular, there is provision for a threshold value, in particular a threshold value greater than 1 to 10 degrees, preferably 1 to 5 degrees.

In a further configuration of the method according to the invention, the threshold value that is greater than zero degrees is increased as the distance of the identification transmitter from the motor vehicle decreases. The distance is determined preferably by means of a delay-time measurement between the signals that are interchanged between motor vehicle and identification transmitter.

In accordance with a particularly preferred embodiment of the method according to the invention, the first, second and/or third antenna each send on an identical or different frequency in the frequency range from 20 kHz to 140 kHz, preferably on approximately 125 kHz, preferably at staggered times.

The above measures can additionally improve the security of the method according to the invention for authorizing the use of a motor vehicle.

The invention additionally proposes an advantageous motor vehicle entry system in which there is provision for the execution of at least one step of the method according to the invention.

In accordance with an advantageous development of the motor vehicle entry system according to the invention, the identification transmitter is a radio key or a smartphone, wherein the smartphone is preferably provided with an identification transmitter software application, such as what is known as an app.

In another advantageous configuration of the motor vehicle entry system according to the invention, the identification transmitter is a smartphone provided with a computer chip, a radio motor vehicle key provided with a computer chip or a chip card having a computer chip.

Finally, in a further advantageous embodiment of the motor vehicle entry system according to the invention, the identification transmitter has a sensor to determine or ascertain an electromagnetic field and/or the components of the electromagnetic field that has been generated by one or more motor vehicle antennas in the region of the identification transmitter.

A particular advantage of the vehicle entry system according to the invention is that it can be provided inexpensively and nevertheless in a fashion reliable against manipulations.

Further, an engine immobilizer according to the invention is proposed in which there is provision for the execution of at least one step of a method according to the invention.

In addition, a motor vehicle having an engine immobilizer according to the invention is proposed, in which there is provision for the execution of at least one step of a method according to the invention.

Finally, the invention proposes a computer program product for controlling at least one processor that prompts the execution of at least one step of a method according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for authorizing use of a motor vehicle, wherein the motor vehicle has a first antenna and a second antenna, wherein the first antenna and the second antenna are at a physical distance from one another, the method comprising:

at each of a first time and a second time defining a predetermined time interval:
emitting a first signal by the first antenna that is received by an identification transmitter antenna of a portable identification transmitter;
ascertaining by the portable identification transmitter a spatial component of a first electromagnetic field of the received first signal;
emitting a second signal by the second antenna that is received by the identification transmitter antenna;
ascertaining by the portable identification transmitter a spatial component of a second electromagnetic field of the received second signal;
ascertaining, by the portable identification transmitter, an angle between the ascertained spatial component of the first electromagnetic field of the received first signal and the ascertained spatial component of the second electromagnetic field of the received second signal;

ascertaining, by the portable identification transmitter, a field strength of the first electromagnetic field of the received first signal and a field strength of the second electromagnetic field of the received second signal; and sending an authorization signal to authorize the use of the motor vehicle to the motor vehicle by the portable identification transmitter only if:
the angle exceeds a predetermined threshold value;
the angle increases over the predetermined time interval;
the field strength of the first electromagnetic field increases over the predetermined time interval; and/or
the field strength of the second electromagnetic field increases over the predetermined time interval;

wherein the angle exceeding the predetermined threshold value, the angle increasing, the field strength of the first electromagnetic field increasing, and the field strength of the second electromagnetic field increasing ascertains that the portable identification transmitter is moving toward the motor vehicle.

2. The method as claimed in claim 1, wherein the ascertained angle is transmitted to the motor vehicle and is provided with a respective timestamp and stored in order to form a reference angle pattern for comparison with angle patterns ascertained later and to provide an authorization signal to authorize the use of the motor vehicle only in an event of a positive pattern comparison.

3. The method as claimed in claim 1, wherein the ascertained field strengths are transmitted to the motor vehicle and are provided with a respective timestamp and stored in order to form a reference field strength pattern for comparison with field strength patterns ascertained later and to provide an authorization signal to authorize the use of the motor vehicle only in an event of a positive pattern comparison.

4. The method as claimed in claim 1, wherein a distance in time between the emitting of the first signal and the emitting of the second signal is so short, but different than zero, such that the ascertaining of the angle is largely not corrupted, or does not become unusable, as a result of a movement of a person carrying the portable identification transmitter or as a result of an associated movement of the portable identification transmitter.

5. The method as claimed in claim 1, wherein the motor vehicle has a third antenna that is at a physical distance from each of the first antenna and the second antenna and wherein, at each of the first and second times, an angle is ascertained by the portable identification transmitter between the ascertained spatial component of the first electromagnetic field of the received first signal and an ascertained spatial component of a third electromagnetic field of a third signal emitted by the third antenna and received by the portable identification transmitter.

6. The method as claimed in claim 5, wherein the spatial component of the third electromagnetic field of the received third signal is an x, y or z component of a Cartesian coordinate system.

7. The method as claimed in claim 5, wherein the first, the second, and the third antennas each emit on an identical or different frequency in a frequency range from 20 kHz to 140 kHz.

8. The method as claimed in claim 7, wherein the first, the second, and the third antennas emit at staggered times.

9. The method as claimed in claim 1, wherein the spatial component of the first electromagnetic field of the received first signal is an x, y or z component of a Cartesian coordinate system.

10. The method as claimed in claim 1, wherein the spatial component of the second electromagnetic field of the received second signal is an x, y or z component of a Cartesian coordinate system.

11. The method as claimed in claim 1, wherein a first vector from x, y and z components of the first electromagnetic field of the received first signal and a second vector from x, y and z components of the second electromagnetic field of the received second signal are formed computationally and, from the first and second vectors, a scalar product thereof is formed computationally.

12. The method as claimed in claim 11, wherein the scalar product is used to determine an angle between the first and second vectors computationally.

13. The method as claimed in claim 1, wherein the predetermined threshold value is 1 to 10 degrees.

14. The method as claimed in claim 1, wherein the predetermined threshold value is greater than zero degrees and is increased as a distance of the portable identification transmitter from the motor vehicle decreases.

15. The method as claimed in claim 14, wherein the distance is determined by a delay-time measurement between the signals that are interchanged between the motor vehicle and the portable identification transmitter.

16. A motor vehicle entry system that executes the method as claimed in claim 1.

17. The motor vehicle entry system as claimed in claim 16, wherein the portable identification transmitter is a radio key or a smartphone, wherein the smartphone is provided with an identification transmitter software application.

18. The motor vehicle entry system as claimed in claim 16, wherein the portable identification transmitter is a smartphone provided with a computer chip, a radio motor vehicle key provided with a computer chip, or a chip card having a computer chip.

19. The motor vehicle entry system as claimed in claim 16, wherein the portable identification transmitter has a sensor and wherein the sensor determines or ascertains an electromagnetic field and/or components of the electromagnetic field that is generated by one or more motor vehicle antennas in a region of the portable identification transmitter.

20. An engine immobilizer that executes the method as claimed in claim 1.

* * * * *